United States Patent
Uchida et al.

(10) Patent No.: US 11,725,950 B2
(45) Date of Patent: Aug. 15, 2023

(54) SUBSTITUTE AUTONOMOUS VEHICLE DATA

(71) Applicant: International Business Machines Corporation, Armonk, NY (US)

(72) Inventors: Kenji Uchida, Tokyo (JP); Daisuke Maruyama, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 17/079,434

(22) Filed: Oct. 24, 2020

(65) Prior Publication Data
US 2022/0128367 A1    Apr. 28, 2022

(51) Int. Cl.
*G01C 21/34*    (2006.01)
*G05D 1/00*    (2006.01)
*G05D 1/02*    (2020.01)

(52) U.S. Cl.
CPC ..... *G01C 21/3415* (2013.01); *G01C 21/3461* (2013.01); *G05D 1/0088* (2013.01);
(Continued)

(58) Field of Classification Search
CPC ............ G01C 21/3415; G01C 21/3461; G05D 1/0088; G05D 1/0253; G05D 1/0257; G05D 2201/0213
See application file for complete search history.

(56) References Cited

U.S. PATENT DOCUMENTS

| 9,384,402 B1 | 7/2016 | Furman et al. |
| 2005/0018879 A1* | 1/2005 | Ito .......................... H04N 7/183 348/E7.087 |

(Continued)

FOREIGN PATENT DOCUMENTS

| CN | 111309005 A | 6/2020 |
| CN | 111337038 A | 6/2020 |

(Continued)

OTHER PUBLICATIONS

Smart Mobility System Research, Development, and Demonstration Projects 2016: "Report on Results of Research and Development Necessary for Demonstration of Automatic Automated Valet Parking and Realization of Advanced Automatic Automated Driving System" (excerpted version).

*Primary Examiner* — Rami Khatib
*Assistant Examiner* — Shahira Baajour
(74) *Attorney, Agent, or Firm* — Jared C. Chaney

(57) ABSTRACT

A navigation request is detected. The navigation request includes a destination for an autonomous vehicle from a starting location. A route is identified from the starting location to destination based on the navigation request. A regulator lookup is performed related to the route based on the navigation request. The regulator lookup is related to an owner of privacy data for one or more regulators. In response to the regulator lookup, a conditional allowance related to the route is received. The conditional allowance indicates that one or more autonomous vehicle sensors of the autonomous vehicle may not capture data related to a first property of a first regulator. the first property is located proximate to the route. The one or more autonomous vehicles sensors of the autonomous vehicle are restricted in response to the conditional allowance.

19 Claims, 9 Drawing Sheets

(52) U.S. Cl.
CPC ......... *G05D 1/0253* (2013.01); *G05D 1/0257* (2013.01); *G05D 2201/0213* (2013.01)

(56) References Cited

U.S. PATENT DOCUMENTS

| | | | |
|---|---|---|---|
| 2005/0075116 A1* | 4/2005 | Laird | A61B 5/24 455/414.1 |
| 2016/0253907 A1 | 9/2016 | Taveira | |
| 2016/0284221 A1* | 9/2016 | Hinkle | G01C 21/20 |
| 2017/0150308 A1 | 5/2017 | Jones | |
| 2017/0193774 A1* | 7/2017 | Meganathan | G08B 13/19645 |
| 2020/0300643 A1 | 9/2020 | Szubbocsev | |

FOREIGN PATENT DOCUMENTS

| | | | |
|---|---|---|---|
| CN | 111426326 A | 7/2020 | |
| JP | 2019026067 A | 2/2019 | |
| WO | 2015102731 A2 | 7/2015 | |
| WO | 2017139282 A1 | 8/2017 | |
| WO | WO-2018132608 A2 * | 7/2018 | ............ B60W 30/08 |

\* cited by examiner

SUBSTITUTE AUTONOMOUS VEHICLE DATA

BACKGROUND

The present disclosure relates to autonomous vehicles, and more specifically, to protecting privacy of location while providing accurate data for autonomous vehicle movement and navigation.

Autonomous vehicles may include driving and flying vehicles. Autonomous vehicles may operate by capturing information about a pathway and may be configured to avoid objects that are on and around the pathway. Autonomous vehicles may not be permitted to operate at certain locations for privacy reasons.

SUMMARY

According to embodiments, disclosed are a method, system, and computer program product. A navigation request is detected. The navigation request includes a destination for an autonomous vehicle from a starting location. A route is identified from the starting location to destination based on the navigation request. A regulator lookup is performed related to the route based on the navigation request. The regulator lookup is related to an owner of privacy data for one or more regulators. In response to the regulator lookup, a conditional allowance related to the route is received. The conditional allowance indicates that one or more autonomous vehicle sensors of the autonomous vehicle may not capture data related to a first property of a first regulator. the first property is located proximate to the route. The one or more autonomous vehicles sensors of the autonomous vehicle are restricted in response to the conditional allowance.

In some embodiments, the restricting the one or more autonomous vehicle sensors includes restricting capture of the first property by the one or more autonomous vehicle sensors.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
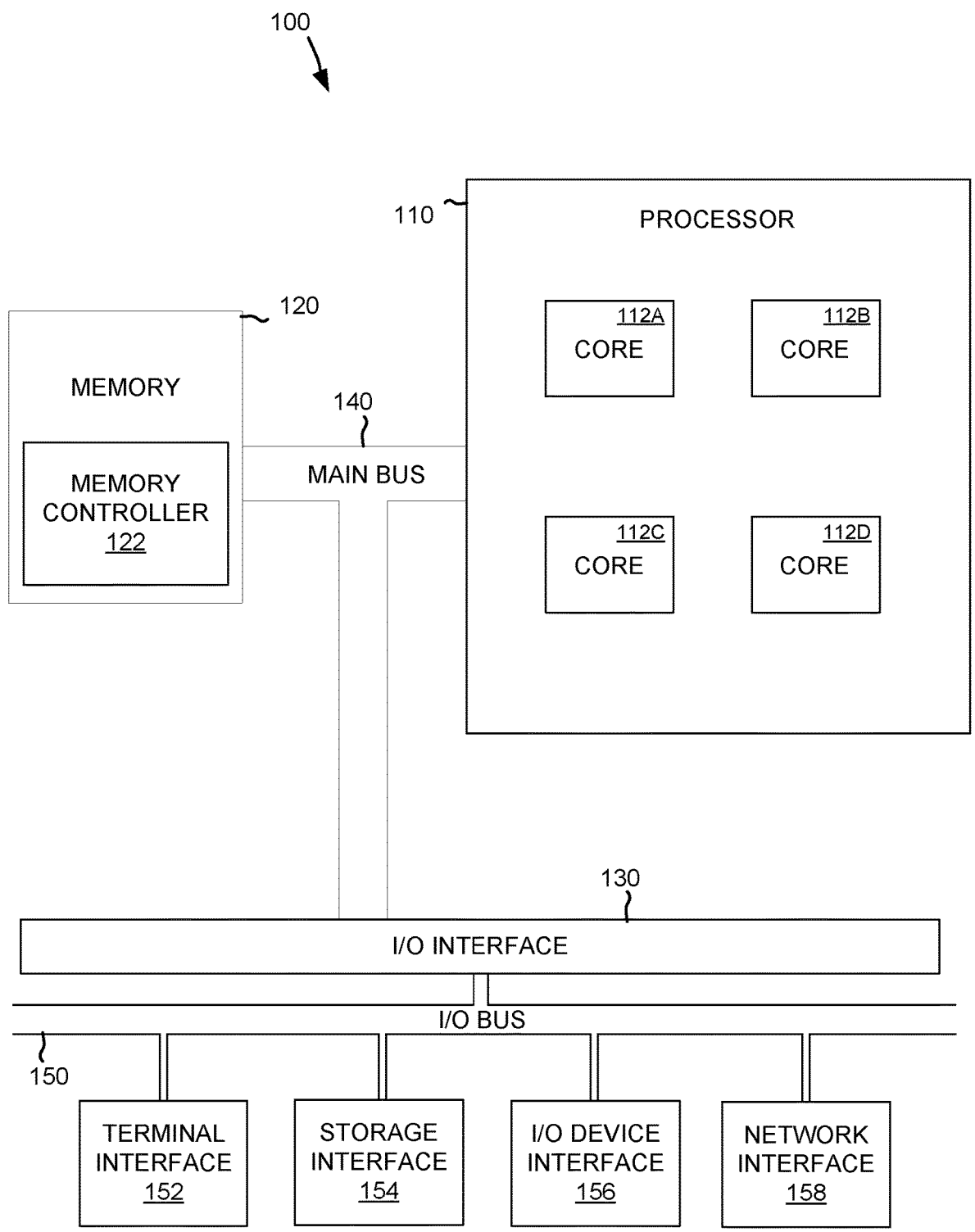
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to autonomous vehicles; more particular aspects relate to protecting privacy of location while providing accurate data for autonomous vehicle movement and navigation. While the present disclosure is not necessarily limited to such applications, various aspects of the disclosure may be appreciated through a discussion of various examples using this context.

Autonomous vehicles are becoming more prevalent throughout society. Autonomous vehicles may include small unmanned autonomous vehicles (e.g., drones) and passenger vehicles (e.g., autonomous cars). Autonomous vehicles may be equipped with various sensors, for making observations regarding the routes or pathways that they travel and for avoiding objects. For example, an autonomous truck may navigate or otherwise move through a predefined or undefined route while acquiring area information of people and other cars. The sensors may be one or more devices, such as cameras, lidars, microphones, speakers, etc., used for operation. During navigation or movement throughout the world the autonomous vehicles may use the sensors to safely operate. For example, autonomous vehicles may use sensors to stop, avoid, or otherwise not make contact with people, cars, street signs, animals, birds, other vehicles. In another example, autonomous vehicles may use sensors to acquire and generate autonomous movement data to stay within a lane or not to drive on a sidewalk or to stay outside of a boundary or other visual area.

Certain conditions may require the capture and preservation of autonomous movement data. For example, autonomous movement data may be required for autonomous vehicle makers and autonomous software makers to audit and analyze. Analysis of autonomous movement data may be valuable for the improvement of the movement performed by autonomous vehicles. Certain bugs or mistakes in movement of autonomous vehicles may not be captured or detected without the autonomous movement data being recorded for the later analysis. In another example, autonomous movement data may need to be provided to law enforcement or arbitrators to analyze incidents. An autonomous vehicle may malfunction, and the situation may need to be arbitrated. Law-makers may make the process easier to arbitrate by requiring that the autonomous vehicle data that was used by the autonomous vehicle for movement and navigation through various areas be saved and accessible for a period of time after performance of autonomous movement (e.g., days, months, years).

Conversely, certain regulations and practical impediments may make the capture of sensor data impossible. Various regulations may be implemented or imposed upon areas through which a vehicle, manned or unmanned, is routed.

One such regulation may be that manned and unmanned automobiles may be restricted with the capture of information in certain regulated areas. For example, a regulated area may be a restricted area of a government national park or property. In another example, unmanned vehicles may be subject to regulations associated with flights according to regional and national aviation legislations that restrict the capture of raw visual data. The raw visual data may include pixel or radar images of certain areas that may or may not be acquired by camera, lidar, or other sensors. Further, regulations may only provide for a binary choice of whether or not passage should be permitted if movement and navigation is performed based on the capture of the environment based on sensors.

Some privacy preserving techniques may include the obscuring or blurring of captured sensor data. This has some drawbacks. Some privacy preserving techniques may be performed such that the autonomous vehicles cannot be audited for information later to determine safe passage and accurate navigation. Not only may the lack of imaging data not permit proper auditing by engineers and law-makers, there may be an impediment to the actual technical operations performed by an autonomous vehicle. For example, to navigate autonomous vehicles may use sensors such as cameras, radar, lidar, and the like for capture of the world they are navigating. If the sensor has obscuring, blurring, or otherwise removal of data that corresponds to the people, animals, and other vehicles, then the autonomous vehicle may fail at a detection algorithm of the data. The detection algorithms performed may be machine learning, neural network, image process, and object detection on the raw values. Take for example, a captured video stream, photo, or other image that has pixel values depicting one or more moving entities. If portions of the image are altered from their raw sensor values, the image analysis may not accurately detect, classify, or place the objects within the scene of the image. Consequently, the autonomous vehicle may erroneously identify objects in the wrong position, or in some cases not identify an object at all.

Further, in areas where binary regulations permit no capture of information of certain areas, autonomous vehicle operation is rendered likely impossible. Even when a partial picture may be permitted, it may be unrealistic for an autonomous vehicle to navigate without sensor data of the entire surroundings of the autonomous vehicle. For example, if there is a regulation that a vehicle is allowed to pass through an outer edge of a certain area on condition that it does not attempt to take a picture in the direction toward the center of the area, then it will be difficult for an automatic autonomous driving vehicle to pass only by photographing a half of the area around the automatic autonomous driving vehicle. Consequently, it is practically difficult for autonomous vehicles to operate without object data received from the autonomous vehicle sensors.

A third-party external sensor system (TESS) may operate to overcome the practical problem of autonomous vehicle operation within various environments. A TESS may operate by providing moving object data to an autonomous vehicle. The TESS may operate by providing the moving object data to an autonomous vehicle as it approaches or nears a proximity of a property. The TESS may be operated by a regulator of the property. For example, a regulator may be a property owner such as an individual person. In another example, the regulator may be a property controller such as a designated contractor or third party that is contracted to operate the property in conjunction with the owner of the property. The TESS may be operated by a central server system. For example, real-time data of stationary and moving entities may be transmitted from the property to a central server. Entities may include one or more real world entities such as people, animals, trees that have yet to be processed by and identified as a stationary object or a moving object.

The TESS may operate by directly restricting operation of one or more sensors of an autonomous vehicle. For example, a regulator or server may override control of one or more sensors of an autonomous vehicle. The TESS may operate by indirectly restricting operation of one or more sensors of an autonomous vehicle. For example, a regulator or server may transmit an instruction to an autonomous vehicle. Responsive to the instruction, the autonomous vehicle may restrict the one or more sensors of the autonomous vehicle such that the autonomous vehicle is not receiving sensor data from the one or more sensors in compliance with the instruction. The restriction of operation of the sensors may occur based on a location of the autonomous vehicle, such as being on or near or otherwise in the proximity of a certain property. The restriction of operation of the sensors may occur temporally, such as for a certain number of minutes or seconds. The restriction may include erasing a portion of a video signal, such as from a camera of the autonomous vehicle. The restriction may include erasing an entire image, frame, or series of images from a video signal.

The TESS may operate by preventing noncompliance of an autonomous vehicle. For example, a regulator or server may instruction or attempt to restrict sensor capture by one or more sensors of an autonomous vehicle. The sensors of the vehicle that may be restricted may include image sensors, radar sensors, lidar sensors, global positioning sensors (GPS), and other relevant navigation and movement sensors. In response, the autonomous vehicle may not comply or otherwise ignore the regulator. Responsively, the regulator or server may instruct the autonomous vehicle to reroute away from the regulated area or to cease autonomous operation. The regulated area may be certain streets, paths, or boundaries of land or water. The regulated area may be certain airspaces.

The TESS may provide substitute data for navigation, movement, and telemetry usage. For example, a regulator or server may provide one or more of the following sensor data: partial images with certain areas greyed out; and processed, deformed, or altered images that obstruct, blur, remove, or otherwise obscure portions of a property or an individual. In some embodiments, a three-dimensional model may be provided to the autonomous vehicle. The TESS may be provided depending on the type of scheme information that an autonomous vehicle can understand, decode, or otherwise access. In some embodiments, a three-dimensional model rendered into an image or image with a two-dimensional overlay may be provided to the autonomous vehicle. The model or overlay may be larger than the object that is obscured by the model or overlay. The additional size of the model or overlay may prohibit the autonomous vehicle or a party that reviews the substitute data from determining the object. The substitute model or overlay may be analyzed by the autonomous vehicle using a relevant technique such as edge detection or object identification to determine that a generic version of a moving object is within an area. For example, a child and a parent may be walking on a sidewalk and a TESS may operate by rendering two three-dimension models that obscure the child and the parent. The substitute data of the TESS may be utilized by the autonomous vehicle for navigation to avoid, move around, or otherwise safely navigate in the environment of the stationary and moving entities. The TESS may perform generation of substitute data continuously or repeatedly. For example, the TESS may provide substitute data of moving entities represented as moving objects in real-time or near real-time every sixteen milliseconds, every 16.68 milliseconds, every second.

FIG. 1 depicts the representative major components of an example computer system 100 (alternatively, computer) that may be used, in accordance with some embodiments of the present disclosure. It is appreciated that individual components may vary in complexity, number, type, and\or configuration. The particular examples disclosed are for example purposes only and are not necessarily the only such variations. The computer system 100 may comprise a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively, 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may comprise a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may comprise an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

Figure 2A:
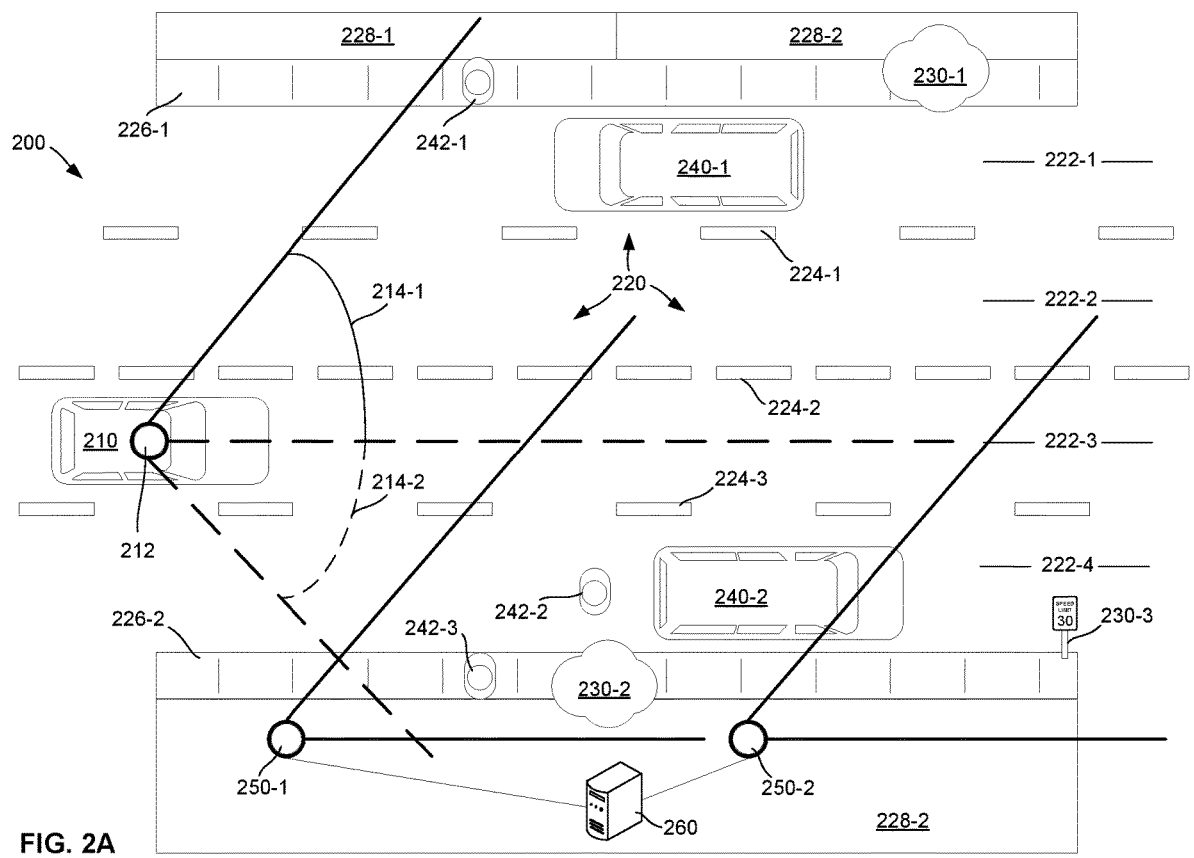
FIG. 2A depicts an example third-party external sensor system (TESS) operating with an autonomous vehicle in an example vehicular environment, consistent with some embodiments of the disclosure.

FIG. 2A depicts an example TESS 200 operating with an autonomous vehicle 210 in an example vehicular environment 220, consistent with some embodiments of the disclosure. The vehicular environment 220 may include the following: a street through a neighborhood having a plurality of driving and parking lanes 222-1, 222-2, 222-3, and 222-4 (collectively, lanes 222); a series of lane markers 224-1, 224-2, and 224-3 (collectively, markers 224), walkways (alternatively sidewalks) for the movement of pedestrians including walkway 226-1 and 226-2 (collectively, walkways 226); and three properties 228-1, 228-2, property 228-3 (collectively, 228).

Lanes 222 may be designated for the two-way flow of traffic and for parking of stationary vehicles. For example, lanes 222 may be designated for the following: lane 222-1 may be designated for left-side street parking; lane 222-2 may be designated for left oncoming traffic; lane 222-3 may be for driving and autonomous navigation by the autonomous vehicle 210; and lane 222-4 may be designated for right-side street parking. The markers 224 may visual indicate the division between the lanes 222 of the vehicular environment 220. For example, markers 224 may include the following: lane marker 224-1 may indicate a boundary between lane 222-1 and lane 222-2; lane marker 224-2 may indicate a boundary between lane 222-2 and lane 222-3; and lane marker 224-3 may indicate a boundary between lane 222-3 and lane 222-4. The lane makers 224 may be configured to indicate to drivers and autonomous vehicles boundaries that should not be crossed or only crossed when performing very specific actions (e.g., vehicular passing, transitioning from parking to driving, lane guidance to orient within a lane, transitioning from driving to parking, making turns to other non-depicted lanes).

The properties 228 may be real property including land, buildings, parks, bodies of water, rocks, walls or other stationary areas that are owned and controlled by properties owners such as individuals, corporations, and government entities. Of the properties 228, property 228-2 may be a property owned and controlled by a regulator. For example, property 228-2 may be a corporate building owned and controlled by a corporation that regulates the viewing and capturing of image data by autonomous vehicles in the vicinity of property 228-2.

The vehicular environment 220 may also include a plurality of moving and stationary entities that are unrelated to the properties 228. For example, stationary entities include the following: stationary entities 230-1, 230-2, and 230-3 (collectively, 230). The stationary entities 230-1 and 230-2 may be trees or shrubs that are near the lanes 222 of the vehicular environment 220. Stationary entity 230-3 may be a sign that visually indicates to entities within vehicular environment 220 one or more rules, laws, or regulations that are to be obeyed by entities within the vehicular environment. Other stationary entities 230 may be contemplated such as rock formations, hillsides, statutes, or monuments. The moving entities may include the following: vehicles 240-1 and 240-2 (collectively, vehicles 240); and pedestrians 242-1, 242-2, and 242-3 (collectively, pedestrians 242). Other moving entities, though not depicted, may be contemplated in the vehicular environment 220. For example, bicycles, dogs, cats, deer, motorcycles, and the like may be entities identified as moving objects that may inhabit vehicular environment 220.

The TESS 200 may include collective cooperative operations by the autonomous vehicles 210 and the regulator of property 228-2. For example, autonomous vehicle 210 may include an autonomous vehicle sensor 212 for capturing data and telemetry from the vehicular environment 220. The sensor 212 may be capable of capturing data within an arc 214. Arc 214 may be defined by two separate sub-arcs depicted in FIG. 2A as sub-arc 214-1 and sub-arc 214-2. The data and telemetry may be used by the autonomous vehicle 210 for generation of autonomous movement data used for navigation and movement around vehicular environment 220 and to not contact other objects. For example, data may be received from autonomous vehicle sensor 212 in the form of visual data, depth sensing data, echolocation data, and the like. Autonomous vehicle sensor 212 may be a radar sensor and the autonomous movement data may be radar readings that indicate a time a flight of a signal bouncing off of various entities in the vehicular environment 220 (e.g., the stationary entities 230, the vehicles 240, and the pedestrians 242). Autonomous vehicle sensor 212 may be a visible light camera configured to capture an image of the vehicular environment 220 (e.g., in the form of red green blue pixels).

The TESS 200 may also operate based on data obtained from the regulator of the property 228-2. For example, property 228-2 may include the following: sensors 250-1 and 250-2 (collectively, sensors 250) configured to capture and record the vehicular environment 220; and a regulator system 260 configured to process the data captured by the sensors 250. Regulator system 260 may be a computer (e.g., computer 100 of FIG. 1) configured to send and receive data and to generate substitute data. The sensors 250 may include image, radar, lidar, and other relevant sensors that are adapted specifically to capture raw sensors data of an environment that is otherwise restricted. For example, sensor 250-1 may be configured to capture an area depicted by the straight lines that extend from sensor 250-1. Further, sensor 250-2 may be configured to capture an area depicted by the straight lines that extend from sensor 250-2.

Figure 2B:
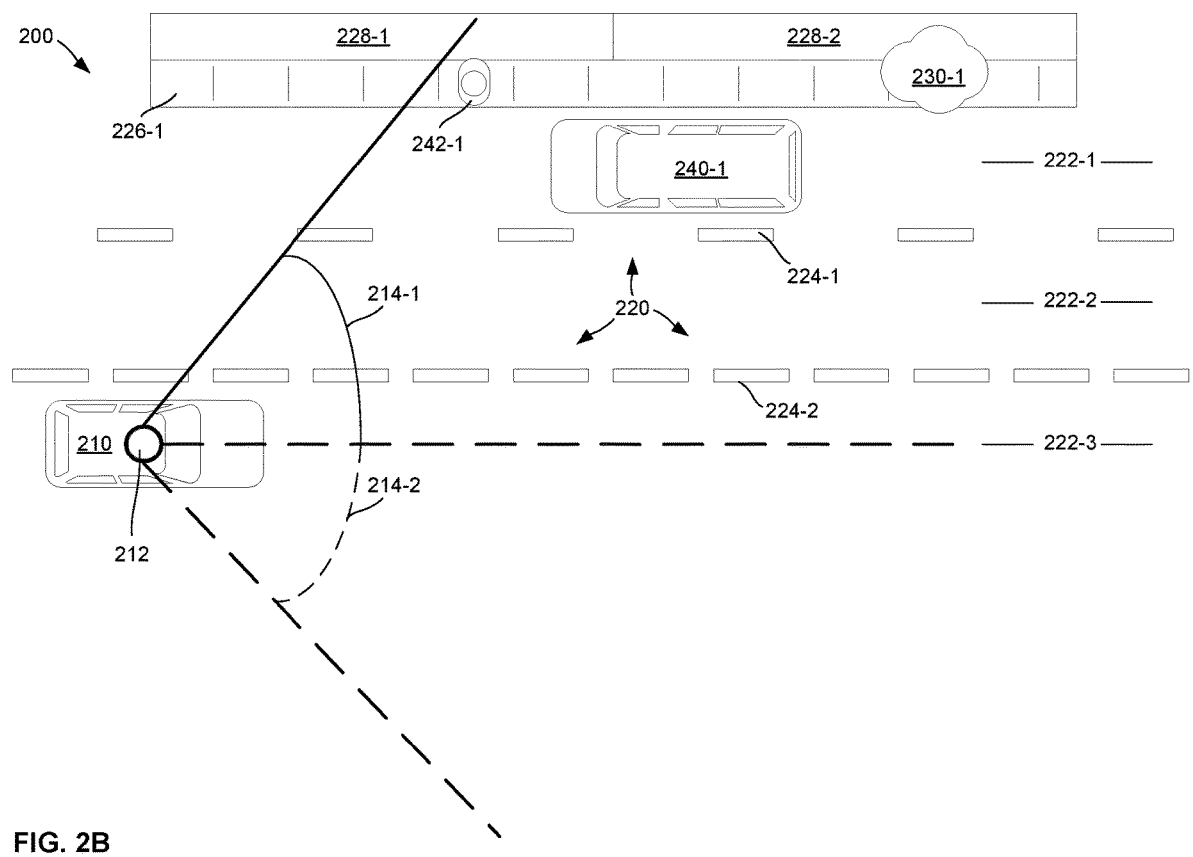
FIG. 2B depicts an example vehicular environment where a TESS operates on an autonomous vehicle to protect the privacy of one or more properties.

FIG. 2B depicts an example vehicular environment 220 where a TESS 200 operates on an autonomous vehicle 210 to protect the privacy of one or more properties. The TESS 200 may be configured to control the capture or recording of one or more autonomous vehicle sensors of certain vehicles. For example, autonomous vehicle 210 may be configured to capture only a portion of vehicular environment 220. The TESS 200 may instruct the autonomous vehicle 210 to completely restrict (e.g., by disabling) the functioning of certain autonomous vehicle sensors in their entirety. For example, the TESS 200 may instruct an autonomous vehicle 210 to not record, capture, or otherwise obtain sensor data.

In some embodiments, the TESS 200 may instruct the autonomous vehicle 210 to partially restrict the functioning of certain autonomous vehicle sensors in their entirety. For example, TESS 200 may instruct autonomous vehicle 210 to restrict the functioning of autonomous vehicle sensor 212, such that only a portion of arc 214 is captured. Responsively, autonomous vehicle 210 may capture sub-arc 214-1 in an unaltered state. Further, autonomous vehicle 210 may capture sub-arc 214-2 in a restricted state. For example, sub-arc 214-2 may have blurred out portions of the sensor data that corresponds to one or more stationary or moving entities in the vehicular environment 220. In some embodiments, sub-arc 214-2 may not be captured and any sensor data from sensor 212 may not be able to view, capture, store, or otherwise analyze the sensor data within sub-arc 214-2. Consequently, the autonomous vehicle 210 may only capture sensor data from autonomous vehicle sensor 212 related to the following entities: lanes 222-1 and 222-2; markers 224-1 and 224-2; walkway 226-1; properties 228-1 and 228-2; stationary entities 230-1; and moving entities, including vehicle 240-1 and pedestrian 242-1. The autonomous vehicle 210 may also only partially capture a part of the vehicular environment 220. For example, the autonomous vehicle sensor 212 may not be able to capture all of lane 222-3.

Figure 2C:
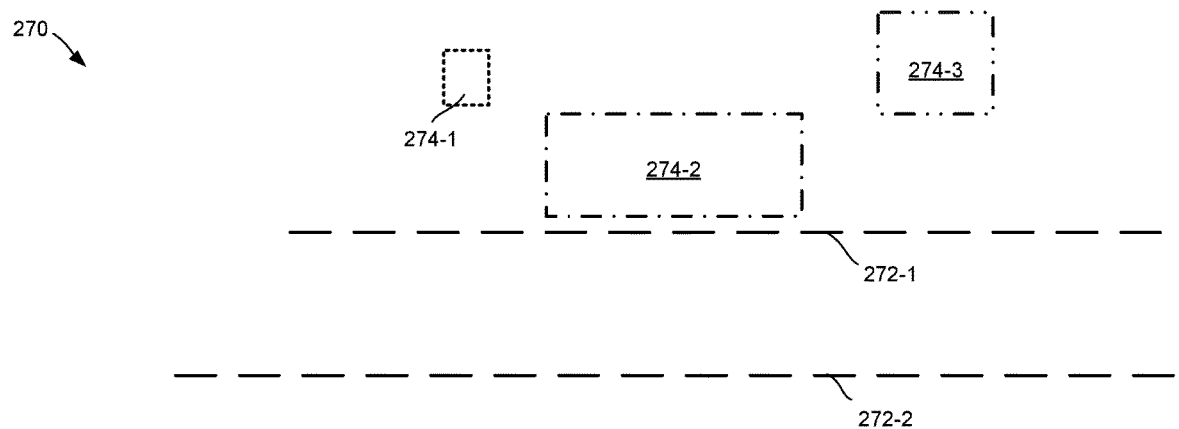
FIG. 2C depicts autonomous movement data captured by an autonomous vehicle of a TESS.

FIG. 2C depicts autonomous movement data 270 captured by an autonomous vehicle 210 of a TESS 200. The autonomous movement data 270 may be captured from vehicular environment 220 from sensor data. Autonomous movement data 270 may be object data that corresponds to various objects located within the vehicular environment 220. The autonomous movement data may include the following: guidance objects 272-1 and 272-2 (collectively, 272) that correspond to lanes 222-1 and 222-2, and markers 224-1 and 224-2, respectively; real-world objects 274-1, 274-2, and 274-3 (collectively, 274). The real-world objects 274 may be autonomous movement data representations of entities of the vehicular environment 220. For example, real-world object 274-1 may be a representation of pedestrian 242-1; real-world object 274-2 may be a representation of vehicle 240-1; and real-world object 274-3 may be a representation of stationary entity 230-1. The format of the autonomous movement data 270 may be derived based on performing image analysis and may be in a relevant object format, such as wireframes, rendered polygons, point clouds, and the like.

Based on the guidance objects 272 and the real-world objects 274. The autonomous vehicle 210 of TESS 200 may successfully navigate the vehicular environment 220. For example, autonomous vehicle 210 may stop, slow down, alter course, or otherwise react based on the presence or movement of real-world objects 274 that update continuously based on autonomous movement data received from autonomous vehicle sensor 212. In another example, autonomous vehicle 210 may orient itself and move along a path based on guidance objects 272-1 and 272-2.

Figure 3:
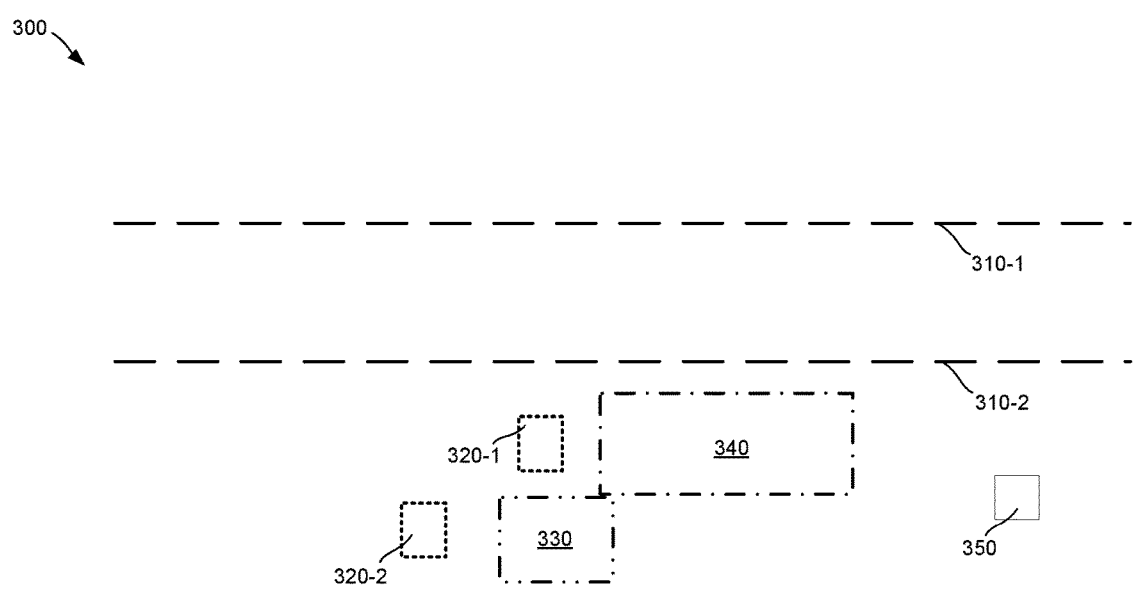
FIG. 3 depicts substitute data captured by a TESS, consistent with some embodiments of the disclosure.

FIG. 3 depicts substitute data 300 captured by a TESS 200, consistent with some embodiments of the disclosure. Substitute data 300 may be captured by a regulator of property 228-2. For example, one or more objects may be captured by sensors 250 and may be provided to autonomous vehicle 210 by the TESS 200. The objects provided by sensors 250 may be in a format consistent with those captured locally by autonomous vehicle 210. In some embodiments, the objects provided by sensors 250 may be in a secondary format and the autonomous vehicle 210 may provide format conversion before utilizing the substitute data 300 for navigation. For example, the substitute data 300 may be of relevant object format, such as wireframes, rendered polygons, point clouds, and the like. The substitute data 300 may not be in the form of raw sensor data, such that any images of entities such as people, cars, animals, and properties that were captured by sensors 250 may not be provided to autonomous vehicle 210. The substitute data 300 may be saved or retained by the autonomous vehicle and may be used to determine the performance of the autonomous vehicle 210 navigating through the vehicular environment 220.

The substitute data 300 may include guidance objects 310-1 and 310-2 that correspond to markers 224-2 and 224-3, and lanes 222-3 and 222-4, respectively. Guidance object 310-1 may be encoded with a flag, variable or other data element. The flag may be understood by autonomous vehicle 210 as corresponding to an object that is decipherable based on permitted sensor data. Based on the flag, autonomous vehicle 210 may be able to combine the substitute data 300 with the autonomous movement data 270 that is captured locally by autonomous vehicle sensor 212 to generate a complete picture of vehicular environment 220. The substitute data 300 may include real-world objects 320-1, 320-2, 330, 340, and 350. Real-world objects 320-1 and 320-2 (collectively, objects 320) may correspond to pedestrians 242-2 and 242-3, respectively. Real-world object 330 may correspond to stationary entity 230-2. Real-world object 340 may correspond to vehicle 240-2. Real-world object 350 may correspond to stationary entity 230-3. Real-world object 350 may be encoded with data, variables, metadata or other values that communicate information on stationary entity 230-3. For example, stationary entity 230-3 may be a sign that communicates to autonomous vehicle 210 movement based regulations, such as a speed limit.

Figure 4:
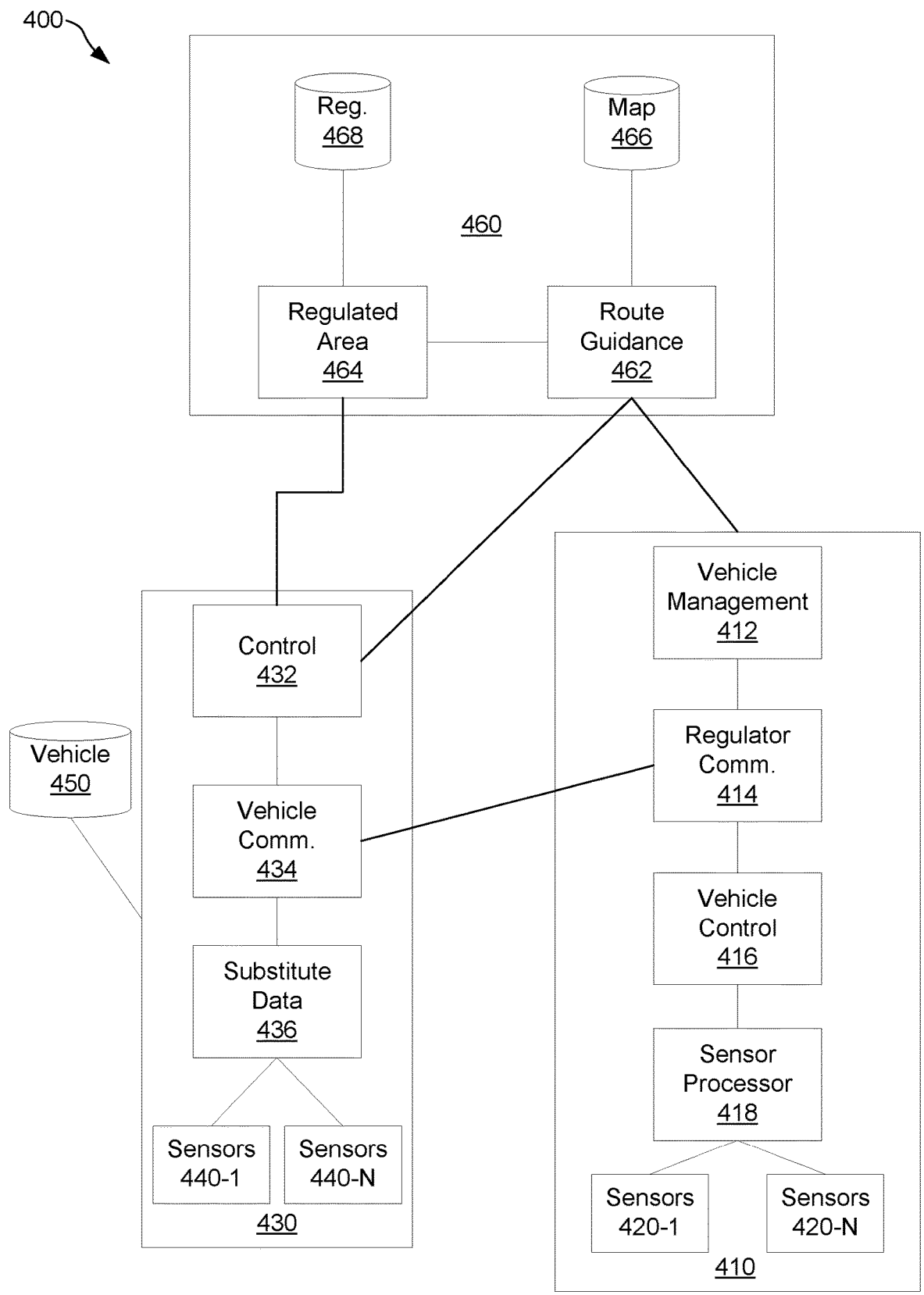
FIG. 4 depicts an example system diagram of a TESS, consistent with some embodiments of the disclosure.

FIG. 4 depicts an example system diagram 400 of a TESS, consistent with some embodiments of the disclosure. System diagram 400 may depict one or more components of a TESS. For example, system diagram 400 may include the following: an autonomous vehicle 410, a regulator system 430, and a central server 460. The autonomous vehicle 410, the regulator system 430, and the central server 460 may be configured with one or more units or modules. The units and modules may include, software (e.g., an operating system, a hypervisor, daemons, jobs), hardware (e.g., one or more processing circuits, computer 100 of FIG. 1), or a combination (e.g., firmware, field programmable gate arrays), configured to perform one or more TESS operations.

The autonomous vehicle 410 may include the following: a vehicle management unit 412, a regulator communication unit 414, a vehicle control unit 416, and a sensor processor unit 418. The autonomous vehicle may include a plurality of autonomous vehicle sensors 420-1 to 420-N (collectively 420).

The vehicle management unit 412 may be configured to operate the autonomous vehicle 410 and to interface with the regulator systems 430 and the central server 460. For example, the vehicle management unit 412 may be configured to perform communication with the central server 460. The vehicle management unit 412 may be configured to perform a regulator lookup related to a route. The regulator lookup may be related to requesting an owner of privacy data of one or more regulators. The owner may be central server 460. The owner of privacy data may be the regulator, and the lookup may be directed to the regulator communication unit 414 to be sent to the regulator system 430. The vehicle management unit 412 may further be configured to oversee operation of the other units of the autonomous vehicle 410. Specifically, the vehicle management 412 unit may be configured for travel route management, including receiving requests to travel to various destinations and to solicit routes from the central server 460. The vehicle management unit 412 may also be configured to capture and receive one or more on-board device management systems and make high-level decisions regarding the autonomous vehicle 410. For example, the vehicle management unit 412 may be configured to decide to maintain a route, to decide to request a different route, to check vehicle status such as battery or fuel status.

The regulator communication unit 414 of the autonomous vehicle 410 may be configured to relay information to the vehicle management unit 412 and to the regulator systems 430. For example, the regulator communication unit 414 may be configured to transmit high-level sensor information, such as a status that substitute data is being received to the vehicle management unit 412. The regulator communication unit 414 may also be configured to receive substitute data and autonomous driving commands from the regulator systems 430.

The vehicle control unit 416 of the autonomous vehicle 410 may be configured to receive commands and perform autonomous navigation for the autonomous vehicle 410. The vehicle control unit 416 may receive commands from the vehicle management unit 412. The vehicle control unit 416 may be configured to receive commands and substitute data from the regulator systems 430 (e.g., by way of the regulator communication unit 414). The vehicle control unit 416 may be configured to operate based on sensor data, such as autonomous movement data acquired from the sensor processor unit 418.

The sensor processor unit 418 may be configured to obtain sensor data from the autonomous vehicle sensors 420 and may be configured to detect, determine, or otherwise analyze image data. The sensor processor may be configured as an image processor. The image processor may be a collection of hardware and software, such as an application specific integrated circuit.

The regulator systems 430 may include the following: a control and authentication unit 432, a vehicle communication unit 434, and a substitute data acquisition unit 436. The regulator system 430 may be associated with a property, such as a building, land, a body of water, a controlled territory, or the like. The associated property may include one or more sensors 440-1 to 440-N (440) configured to capture and transmit object information that corresponds to one or more real-world entities that may be located on the property. For example, the property associated and controlled by regulator system 430 may be a theme park, and the sensors 440 may be property cameras owned and controlled by the theme park. The property cameras may be configured to capture a line of patrons that are located in the parking lot or the movement of pedestrians surrounding the outside proximity (e.g., the gates and neighboring streets and roads) of the park. The regulator system 430 may also be communicatively coupled to a vehicle data control information database 450 (alternatively, vehicle database). The vehicle database 450 may include one or more sensor profiles (e.g., camera specifications, lidar placement diagrams, radar blueprints). The vehicle database 450 may be organized, referenced, or keyed based on various models of autonomous vehicle. For example, autonomous vehicle 410 may have a certain configuration or layout of autonomous vehicles sensors 420 and processing capabilities of sensor processor unit 418.

The control and authentication unit 432 may communicate with the central server 460, the authentication unit may be notified of various autonomous vehicles that may or may not request to travel within the proximity of the property of the regulator system 430 (e.g., the area adjacent to the property, or roads, streets, bodies of water, or land of the property or proximate to the property). The control and authentication unit 432 may also be configured to authenticate, approve, or otherwise permit access to various vehicles to the central server 460. The control and authentication unit 432 may also be configured to proactively communicate with the central server 460 responsive to detecting the presence of a vehicle (e.g., autonomous or otherwise) that is not authorized to come within the proximity. The control and authentication unit 432 may, in some embodiments, request the central server 460 to reroute, delay, or otherwise alter the passage of vehicles that may or may not be permitted to travel in the proximity of the property of the regulator system 430.

The vehicle communication unit 434 may operate in conjunction with the control and authentication unit 432. For example, the vehicle communication unit 434 may operate by receiving a status of one or more proximate, or soon-to-be proximate vehicles. The vehicle communication unit 434 may also operate by instructing or otherwise performing guidance and TESS with an autonomous vehicle. For example, the vehicle communication unit 434 may communicate to autonomous vehicle 410 various guidance, navigation, or movement instructions or commands. The vehicle communication unit 434 may, based on sensor information received from the sensors 440 or from the regulator communication unit 414 of the autonomous vehicle 410, gather real-time sensor information (e.g., sensor data). Based on the sensor data, the vehicle communication unit 434 may generate autonomous movement data.

The substitute data generation unit 436 may generate autonomous movement data for the vehicle communication unit 434. The substitute data generation unit 436 may include one or more processing circuits configured to analyze the sensor data of sensors 440 and to perform object recognition. The substitute data generation unit 436 may include an image processor. The substitute data generation unit 436 may be configured to perform real-time or near real-time generation of substitute data for autonomous vehicle 410. The vehicle communication unit 434 may generate instructions to delay the autonomous movement or guidance until the substitute data is generated and provided to the autonomous vehicle (e.g., a delay of thirty seconds before performing autonomous movement and navigation). The substitute data generation unit 436 may convert or format the substitute data based on sensor profile information stored in the vehicle database 450 (e.g., to format sensor data from sensors 440 into a format that vehicles sensor processor 418 can understand).

The image processor of sensor processor 418 and substitute data generation unit 436 may be configured to perform various image analysis techniques. The image analysis techniques may be machine learning and/or deep learning-based techniques. These techniques may include, but are not limited to, region-based convolutional neural networks (R-CNN), you only look once (YOLO), edge matching, clustering, grayscale matching, gradient matching, invariance models, geometric hashing, scale-invariant feature transform (SIFT), speeded up robust feature (SURF), histogram of oriented gradients (HOG) features, and single shot multibox detector (SSD). In some embodiments, the image processor may be configured to aid in identifying a of entities in an environment (e.g., by analyzing images of faces using a model built on training data, of animals, people, children, and other moving objects, by analyzing images of automobiles using a model build on training data of trucks, cars, buses, and other vehicles).

In some embodiments, objects may be identified using an object detection algorithm, such as an R-CNN, YOLO, SSD, SIFT, Hog features, or other machine learning and/or deep learning object detection algorithms. The output of the object detection algorithm may include one or more identities of one or more respective objects with corresponding match certainties. For example, a sensor data from the autonomous vehicle sensors 420 or sensors 440 entities such as kids running, adults walking, and animals moving, may be analyzed. Using a relevant object detection algorithm, the various entities may be identified as objects with boundaries, bounding boxes, polygons, wireframes, and the like.

In some embodiments, features of the objects may be determined using a supervised machine learning model built using training data. For example, an image may be input into the supervised machine learning model and various classifications detected within the image can be output by the model. For example, characteristics such as object material (e.g., cloth, metal, plastic, etc.), shape, size, color, and other characteristics may be output by the supervised machine learning model. Further, the identification of objects (e.g., a tree, a human face, a dog, etc.) can be output as classifications determined by the supervised machine learning model. For example, if autonomous vehicle 410 snaps an image of another vehicle, a supervised machine learning algorithm may be configured to output an identity of the object (e.g., automobile) as well as various characteristics of their vehicle (e.g., the model, make, color, etc.).

In some embodiments, characteristics of objects may be determined using photogrammetry techniques. For example, shapes and dimensions of objects may be approximated using photogrammetry techniques. In some embodiments, characteristics of objects may be identified by referencing an ontology. For example, if an object is identified (e.g., using an R-CNN), the identity of the object may be referenced within an ontology to determine corresponding attributes of the object. The ontology may indicate attributes such as color, size, shape, use, etc. of the object. The ontology may indicate relationships of the object to one or more regulations or rules, e.g., signs depicting speed limits, a sign placing a conditional limit during the presence of children and concurrently a second object identified and classified as a child.

Characteristics may include the shapes of objects, dimensions (e.g., height, length, and width) of objects, a number of objects (e.g., number of headlights indicative of a passenger car), colors of object, and/or other attributes of objects. In some embodiments, the output may generate a list including the identity and/or characteristics of objects (e.g., cotton shirt, metal glasses, fur of an animal, height of adulthood of a person, etc.). In some embodiments, the output may include an indication that an identity or characteristic of an object is unknown. In some embodiments, various objects, object attributes, and relationships between objects (e.g., hierarchical and direct relations) may be represented within a knowledge graph (KG) structure. Objects may be matched to other objects based on shared characteristics (e.g., skin-tone of a cheek of a person and skin-tone of a chin of a person, reflectivity of a windshield of a car, pattern or repeating signal strength of a certain color indicative of a dividing line or lane marker on a street), relationships with other objects (e.g., an eye belongs to a face), or objects belonging to the same class (e.g., two vehicles are currently moving vehicles, while a third vehicle is a stationary entity).

The central server 460 may be communicatively coupled to the autonomous vehicle 410 and the regulator system 430. The central server 460 may include a route guidance unit 462 and a regulated area unit 464. The route guidance unit 462 may be configured to receive, process, and respond to requests from autonomous vehicles (e.g., autonomous vehicle 410). The route guidance unit 462 may be configured to provide directions, pathways, roads, streets, and other information to autonomous vehicles based on map data 466. The route guidance unit 462 may also be configured to monitor and keep track of positional information along routes of currently operating vehicles for regulators. For example, central server 460 may be queried regarding the status of any vehicle that is routed proximate to the property of regulator system 430 by regulator system 430. The route guidance unit 462 may, responsive to a query, provide status of autonomous vehicle 410 (e.g., as autonomous vehicle 410 approaches or becomes proximate to the property of regulator system 430). The route guidance unit 462 may be configured to transmit conditional allowances related to a route. For example, the conditional allowance may indicate that one or more autonomous vehicle sensors 420 of the autonomous vehicle 410 may not capture data related to one or more properties located proximate to the route.

The regulated area unit 464 may communicate solely with regulator systems and the route guidance unit 462. The route guidance unit 462 may make requests to the regulated area unit 464. The regulator systems may also make requests to the regulated area unit 464. The requests may be in the form of requests to determine if routes of autonomous vehicles are to pass within the boundary or proximity of a regulated property. The requests may be in the form of an update to the regulated area information database 468. The regulated area unit 464 may manage regulated property information and may store and update the property information in the regulated area information database 468. Based on the information, the regulated area unit 464 may update the route guidance unit 462 and may notify the route guidance unit 462 if an autonomous vehicle is to pass within the path of a regulated property.

Figure 5:
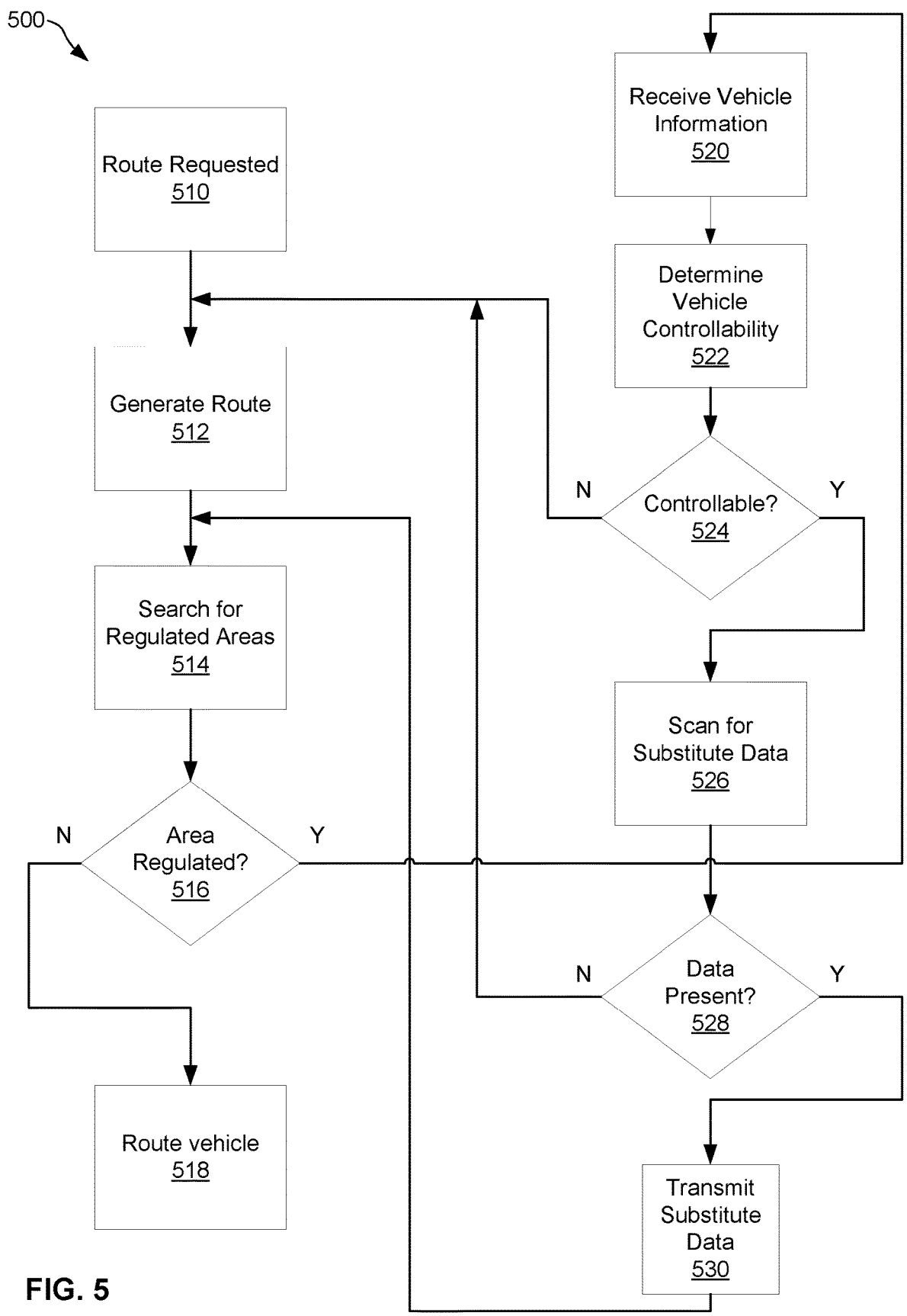
FIG. 5 depicts an example method for performing TESS, consistent with some embodiments of the disclosure.

FIG. 5 depicts an example method 500 for performing TESS, consistent with some embodiments of the disclosure. TESS may be performed by a processing device of a computer system (e.g., computer 100). TESS may begin at 510 when a route is requested from an autonomous vehicle (a navigation request) (e.g., for example, autonomous vehicle 210 of FIG. 2A). The request may be transmitted by an autonomous vehicle and may be sent to a central server (e.g., central server 460 of FIG. 4). The route request may include vehicle information of an autonomous vehicle. The vehicle information may include one or more of the following: the current position of the autonomous vehicle; a requested destination for the autonomous vehicle; a list of one or more sensor of the autonomous vehicle. The list of one or more sensors may include a list of sensor capabilities and specifications. The list of one or more sensors may include schema information. The schema information may include parameters of substitute data that can be processed by the autonomous vehicle.

At 512, a route may be generated for the autonomous vehicle. The route may be generated by a central server (e.g., central server 460 of FIG. 4). Generation of the route may include one or more route factors (e.g., traffic, speed limits, alternatives, weather patterns, etc.). Generation of the route may be influenced based on a regulator. For example, regulators may transmit suggestions to the central server, and the central server may adjust the route during route generation. Generation of the route may be based on querying a map database (e.g., map data 466 of FIG. 4).

At 514 a generated route may be searched for one or more regulated areas 514. The search for regulated areas 514 may be based on searching within a predefined threshold. For example, a predefined threshold may be a search for a regulated area within one mile of the route. In another example, a predefined threshold may be a search for a regulated area within one third of a mile of the route. The search for regulates areas 514 may be a search for regulated areas that are adjacent to a route, e.g., a street along the route that is adjacent to a regulated area.

If a regulated area is found from the search, at 516:Y, a vehicle information may be received at 520. The vehicle information may be received by a regulator that was found as adjacent to the generated route. For example, given FIG. 4, a vehicle information may be received by regulator system 430 based on a determination that autonomous vehicle 410 has a route generated that includes a portion of the route that is proximate to the property in control by regulator system 430. The received vehicle information may be an unaltered version of the vehicle information that was received along with the route request at 510. In some embodiments, the received status may include an altered version of the vehicle status. For example, identifying personal information that is included in the vehicle information may be stripped by the central server before being received at 520. At 522, the vehicles controllability may be determined. The determination may be made by the regulator (e.g., regulator system 430). The determination may be made by analysis of the received information of the autonomous vehicle. For example, by analyzing the list of one or more sensors and list of one or more sensor capabilities. If a vehicle is determined not to be controllable at 524:N, the route may be regenerated at 512. The route may be regenerated at 512 by rerouting the autonomous vehicle away from the proximity of the property.

If a vehicle is determined to be controllable at 524:Y, the property of the regulator may be scanned for substitute data at 526. The scan for substitute data may be a scan for data that has sufficient resolution. For example, cameras located on the property that are able to capture entities at a sufficient pixel resolution. The scan may include a determination that sensors are able to capture entities around the property at a sufficient framerate to capture the motion or speed of the entities. For example, image processing and detection may determine that a property has a human capable of moving at twenty-seven miles per hour. In another example, scanning may include detection of a vehicle capable of moving at 100 miles per hour. Based on the speed capabilities of entities in the proximity of a property, a regulator may determine that there is a sensor with a framerate capable of capturing the entities.

The scan for substitute data may be performed by a regulator that owns and controls the property and the sensors of the property. For example, regulator system 430 may be configured to observe sensors 440 and make a determination that the substitute data is sufficient. The scan for substitute data may include a scan for data that confers with the schema information that was received from the autonomous vehicle. As the schema information may include the format of the data, the scan may be a scan for data that conforms to the format requests/required by the autonomous vehicle. In some embodiments, the data may need to be converted, and the scan for substitute data may include a scan for processing power, memory bandwidth, or other computing resources available to perform a conversion into a native format for the autonomous vehicle. The scan for substitute data may include a determination that a regulator can provide sufficient quality of data, and a determination that a regulator can provide data compliant with a required schema of an autonomous vehicle. If a substitute data is not present for the property at 528:N, the route may be regenerated at 512. The route may be regenerated at 512 by rerouting the autonomous vehicle away from the proximity of the property. If substitute data is present at 528:Y, the substitute data may be formatted and transmitted at 530. The substitute data may be transmitted back to the central server for transmission to the autonomous vehicle. The substitute data may be transmitted directly to the autonomous vehicle.

After transmission of the substitute data to a vehicle, the regenerated route may be researched for additional regulated areas 514. If no regulated areas are found, at 516:N, then the vehicle may be routed at 518. Routing of the autonomous vehicle at 518 may include a granting of permission to begin autonomous movement by the autonomous vehicle. Method 500 ends after vehicle is routed at 518.

Figure 6:
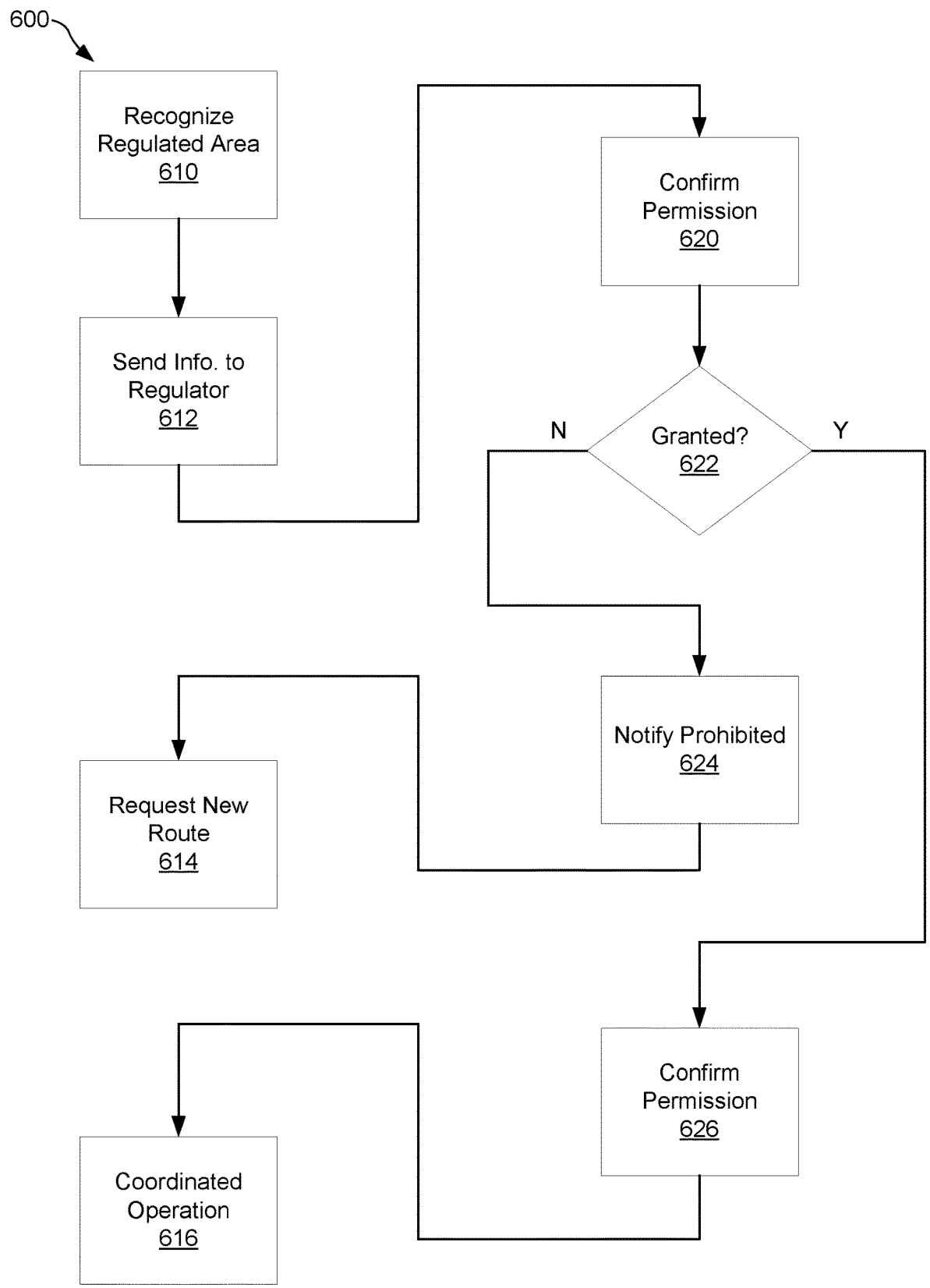
FIG. 6 depicts an example method for performing TESS, consistent with some embodiments of the disclosure.

FIG. 6 depicts an example method 600 for performing TESS, consistent with some embodiments of the disclosure. TESS may be performed by a processing device of a computer system (e.g., computer 100 of FIG. 1). Method 600 may be performed after method 500—for example, after an autonomous vehicle begins a route that was generated by a central server.

Method 600 begins when a regulated area is recognized at 610. The area may be recognized by an autonomous vehicle (e.g., autonomous vehicle 410 of FIG. 4). The area may be recognized by the autonomous vehicle based on route information received by a central server (e.g., central server 460 of FIG. 4). The recognition of the autonomous vehicle may be based on one or more sensors of the autonomous vehicle. For example, the autonomous vehicle may have a GPS sensor configured to provide guidance and to geolocate the autonomous vehicle. The autonomous vehicle may have also received information about the latitude and longitude of regulated areas from the central server. The recognition of the autonomous vehicle may be based on receiving a notice from a regulator. For example, a regulator may broadcast a signal that notifies autonomous vehicles within the vicinity that the regulator requests authentication before the autonomous vehicle may pass the proximity.

At 612, information of the autonomous vehicle may be sent to the regulator. The information may include the following: an identifier of the autonomous vehicle; device information of the autonomous vehicle; a location of the autonomous vehicle; sensor data of the autonomous vehicle; and schema information of potential substitute data that can be received by the autonomous vehicle.

At 620, a permission of the autonomous vehicle to be in the proximity of the property of the regulator may be confirmed. The permission may be confirmed based on information received from the autonomous vehicle. The permission may be confirmed by a regulator (e.g., regulator system 430 of FIG. 4). If the regulator did not grant permission at 622:N, the autonomous vehicle may be notified at 624 by a regulator. The notification may indicate that passage in a proximity of the property of the regulator is prohibited by the autonomous vehicle. Based on receiving the notification, the autonomous vehicle may request a new route at 614 and method 600 may end.

If the regulator did grant permission at 622:Y, the regulator may transmit confirmation of permission to the autonomous vehicle at 626. The confirmation of the permission at 626, may include a beginning of substitute data configured based on the scheme information, sent at 612. Based on receiving the confirmation of permission, the autonomous vehicle may begin operating in a coordinated fashion at 616. The coordinated operation may include receiving substitute data from the regulator. For example, regulator system 630 may continuously send substitute data and control information to the autonomous vehicle. After the autonomous vehicle begins operating in coordination with the regulator at 616, method 600 may end.

Figure 7:
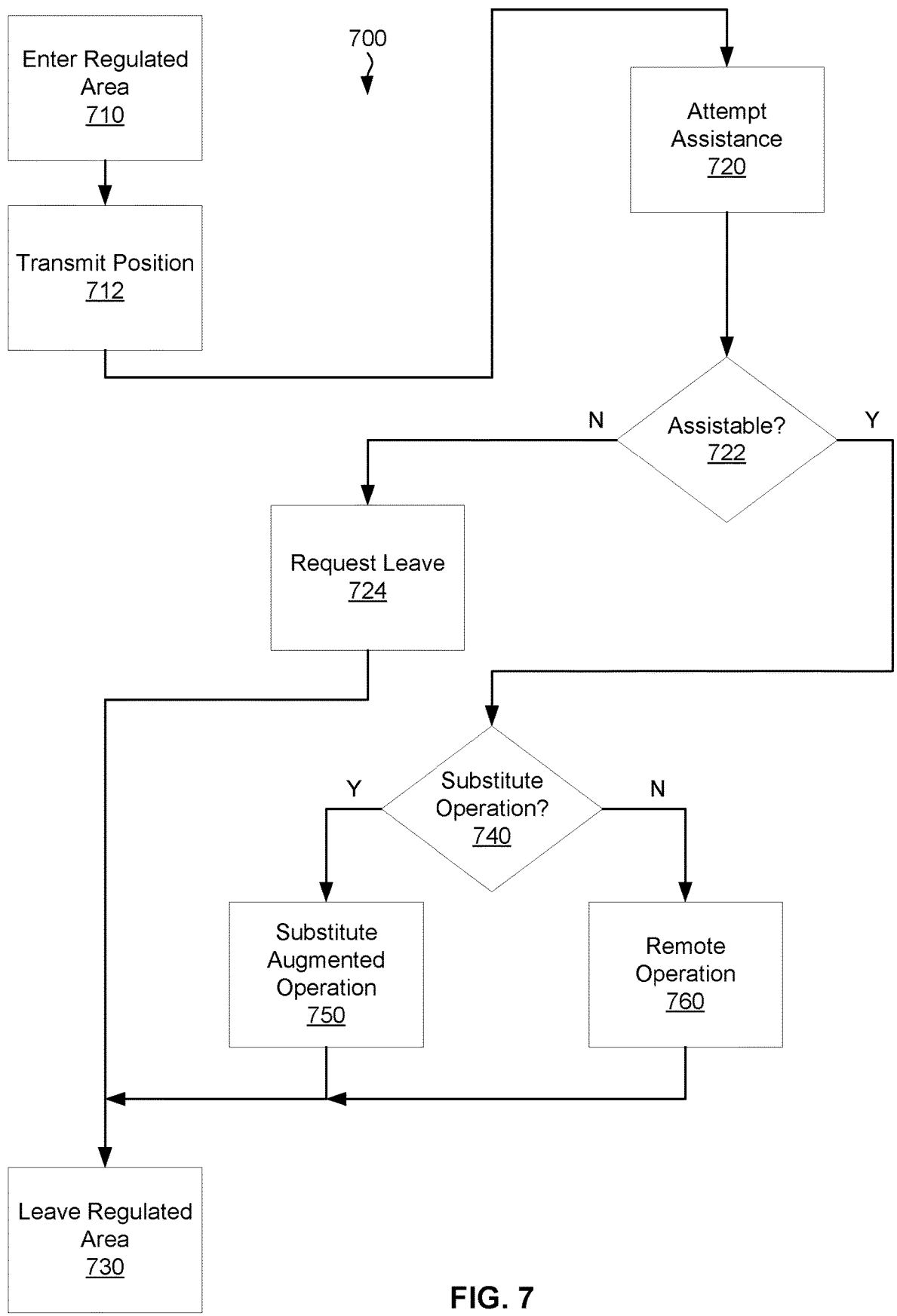
FIG. 7 depicts an example method for performing TESS, consistent with some embodiments of the disclosure.

FIG. 7 depicts an example method 700 for performing TESS, consistent with some embodiments of the disclosure. TESS may be performed by a processing device of a computer system (e.g., computer 100 of FIG. 1). Method 700 may be performed in some embodiments of performing TESS by a combination of an autonomous vehicle (e.g., autonomous vehicle 210 of FIG. 2, and a regulator (e.g., regulator system 430 of FIG. 4). Method 700 may be performed after method 600. For example, method 700 begins when an autonomous vehicle enters a regulated area. Entering the regulated area may be entering a proximity of a regulated area.

At 712, the autonomous vehicle may transmit its current position and other telemetry information (e.g., speed, altitude, pitch, autonomous vehicle sensor status) to a regulator. For example, autonomous vehicle 410 may transmit position and telemetry information to regulator system 430. At 720 a regulator may begin to attempt assistance of the autonomous vehicle. Attempting of assistance may include scanning the received position information. Attempting of assistance may include determining that the autonomous vehicle can perform autonomous movement and navigation without using, or with restriction on, the capabilities of one or more autonomous vehicle sensors of the autonomous vehicle. If it is determined that the autonomous vehicle is not assistable at 722:N, the regulator may request the autonomous vehicle to leave the regulated area at 724. Based on receiving a request to leave the regulated area, the autonomous vehicle may adjust its route to leave the regulated area as quickly as possible. At 730 the autonomous vehicle may leave the regulated area 730, after receiving a request to leave from the regulator.

If the autonomous vehicle is assitable at 722:Y, the regulator may determine if the autonomous vehicle can function based on substitute data operation at 740. The determination may be based on if the autonomous vehicle is configured to receive substitute data from the regulator. The determination may be based on if the autonomous vehicles is configured to composite the substitute data with one or more autonomous vehicle data that is generated by the autonomous vehicle from one or more autonomous vehicle sensors.

If the autonomous vehicle is capable of functioning based on substitute data operation at 740:Y, substitute data operation may commence at 750. Substitute data operation may be performed continuously. For example, substitute data operation may be performed every second, every 100 milliseconds, sixty times per second, etc. Substitute data operation may include the transmission of substitute data to the autonomous vehicle. Substitute data may be converted by the regulator, and based on received schema information, before being transmitted to the autonomous vehicle. In some embodiments, the autonomous vehicle may perform the conversion of the substitute data for use in autonomous movement and navigation. Substitute data operation may also include restricting the autonomous vehicle sensors of the autonomous vehicle. For example, a regulator may transmit a disable signal, a restriction signal, or another signal and responsively the autonomous vehicle may disable or restrict one or more of the autonomous vehicle sensors from capturing sensor data. Substitute data operation may be performed by the regulator transmitting the substitute data and the autonomous vehicle navigating the environment, until the autonomous vehicle leaves the regulated area at 730.

If the autonomous vehicle is not capable of functioning based on substitute data operation at 740:N, the autonomous vehicle moves through the regulated area based on remote operation 760. Remote operation 760 may include performing autonomous vehicle navigation and movement based on the autonomous vehicle offloading sensors data and telemetry information continuously to the regulator or to a central server. The regulator or central server may perform autonomous driving and the autonomous vehicle may not capture, record, or otherwise be able to analyze the sensor data of the autonomous vehicle sensors. Remote operation may be performed until the autonomous vehicle leaves the regulated area at 730. After the autonomous vehicle leaves the area at 730, method 700 may end.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   detecting a navigation request, the navigation request including a destination for an autonomous vehicle from a starting location;
   identifying, based on the navigation request, a route from the starting location to the destination;
   performing, based on the navigation request, a regulator lookup related to the route, wherein the regulator lookup is related to identifying an owner of privacy data for a first regulator among one or more regulators;
       receiving, in response to the regulator lookup, a conditional allowance related to the route, the conditional allowance indicating that one or more autonomous vehicle sensors of the autonomous vehicle may not capture data related to a first property of the first regulator among the one or more regulators, the first property located proximate to the route; and
   restricting, in response to the conditional allowance, the one or more autonomous vehicle sensors of the autonomous vehicle, wherein the restricting includes restricting capture of the first property by the one or more autonomous vehicle sensors,
   wherein the owner of privacy data for the first regulator is the first regulator, and
   wherein performing the regulator lookup comprises:
       receiving a response from a central server, the response indicating that the first regulator is related to the conditional allowance; and
       prompting, based on the response, the first regulator for the conditional allowance.

2. The method of claim 1 further comprising:
   controlling autonomous movement on the route based on autonomous movement data received from the one or more autonomous vehicle sensors;
   detecting, during the autonomous movement, a proximity of the autonomous vehicle to the first property of the first regulator; and
   erasing, in response to the detecting of the proximity, a portion of a video signal of a camera of the one or more autonomous vehicle sensors;
   generating substitute data related to the first property of the first regulator; and
   replacing a portion of the autonomous movement data, wherein the portion corresponds to the camera with the substitute data.

3. The method of claim 2, wherein the portion of the video signal is an entire image of the video signal.

4. The method of claim 2, wherein the generating of the substitute data comprises: requesting moving object data generated from a first property camera owned and controlled by the first regulator.

5. The method of claim 4, wherein the moving object data is selected from the group consisting of, a person walking or running, an animal crossing a vehicle path, another autonomous vehicle driving, another autonomous vehicle flying, street signs, and lane guidance.

6. The method of claim 1 further comprising:
   receiving a second conditional allowance indicating that the one or more sensors of the autonomous vehicle may not capture data related to a second property of a second regulator of the one or more regulators, the second property located proximate to the route;
   controlling autonomous movement on the route based on autonomous movement data received from the one or more sensors of the autonomous vehicle;
   detecting, during the autonomous movement, a proximity of the autonomous vehicle to the second property of the second regulator; and
   disabling, in response to the detecting of the proximity, a first radar sensor of the one or more sensors of the autonomous vehicle;
   generating substitute data related to the second property of the second regulator; and
   replacing a portion of the autonomous movement data, wherein the portion corresponds to the first radar sensor with the substitute data.

7. The method of claim 6, wherein the generating of the substitute data comprises:
   requesting moving object data generated from a second radar sensor of a second autonomous vehicle, the second autonomous vehicle owned and controlled by the second regulator.

8. The method of claim 1, wherein the regulator lookup includes a query of whether the route is proximate to any regulated areas, and wherein the conditional allowance indicates that multiple regulated areas are proximate to the route.

9. The method of claim 1, wherein the first regulator is the central server.

10. A system, the system comprising:
    a memory, the memory containing one or more instructions; and
    a processor, the processor communicatively coupled to the memory, the processor, in response to reading the one or more instructions, configured to:
        detect a navigation request, the navigation request including a destination for an autonomous vehicle from a starting location;
        identify, based on the navigation request, a route from the starting location to the destination;
        perform, based on the navigation request, a regulator lookup related to the route, the regulator lookup related to identifying an owner of privacy data for a first regulator among one or more regulators;

receive, in response to the regulator lookup, a conditional allowance related to the route, the conditional allowance indicating that one or more autonomous vehicle sensors of the autonomous vehicle may not capture data related to a first property of the first regulator among the one or more regulators, the first property located proximate to the route, restrict, in response to the conditional allowance, the one or more autonomous vehicle sensors of the autonomous vehicle, wherein the restricting the one or more autonomous vehicle sensors includes restricting capture of the first property by the one or more autonomous vehicle sensors, wherein the owner of privacy data for the first regulator is the first regulator, and wherein performing the regulator lookup comprises:
receiving a response from a central server, the response indicating that the first regulator is related to the conditional allowance; and
prompting, based on the response, the first regulator for the conditional allowance.

11. The system of claim 10, wherein the processor is further configured to:
perform autonomous movement on the route based on autonomous movement data received from the one or more autonomous vehicle sensors;
detect, during the autonomous movement, a proximity of the autonomous vehicle to the first property of the first regulator; and
erase, in response to the detecting of the proximity, a portion of a video signal of a camera of the one or more autonomous vehicle sensors;
generate substitute data related to the first property of the first regulator; and replace a portion of the autonomous movement data, wherein the portion corresponds to the camera with the substitute data.

12. The system of claim 11, wherein the portion of the video signal is an entire image of the video signal.

13. The system of claim 11, wherein the generating of the substitute data comprises: requesting moving object data generated from a property camera owned and controlled by the first regulator.

14. The system of claim 13, wherein the moving object data is selected from the group consisting of, a person walking, a child running on a sidewalk, an animal crossing a road, another autonomous vehicle driving, another autonomous vehicle flying, street signs, and lane guidance.

15. A non-transitory computer program product, the computer program product comprising: one or more computer readable storage media; and
program instructions collectively stored on the one or more computer readable storage media, the program instructions configured to:
detect a navigation request, the navigation request including a destination for an autonomous vehicle from a starting location;
identify, based on the navigation request, a route from the starting location to the destination;
perform, based on the navigation request, a regulator lookup related to the route, wherein the regulator lookup is related to identifying an owner of privacy data for a first regulator one or more regulators;
receive, in response to the regulator lookup, a conditional allowance related to the route, the conditional allowance indicating that one or more autonomous vehicle sensors of the autonomous vehicle may not capture data related to a first property of the first regulator among the one or more regulators, the first property located proximate to the route,
restrict, in response to the conditional allowance, the one or more autonomous vehicle sensors of the autonomous vehicle, wherein the restricting the one or more autonomous vehicle sensors includes restricting capture of the first property by the one or more autonomous vehicle sensors,
wherein the owner of privacy data for the first regulator is the first regulator, and
wherein performing the regulator lookup comprises:
receiving a response from a central server, the response indicating that the first regulator is related to the conditional allowance; and
prompting, based on the response, the first regulator for the conditional allowance.

16. The non-transitory computer program product of claim 15, wherein the regulator lookup includes a query of whether the route is proximate to any regulated areas, and wherein the conditional allowance indicates that multiple regulated areas are proximate to the route.

17. The non-transitory computer program product of claim 15, wherein the program instructions are further configured to:
receive a second conditional allowance indicating that the one or more sensors of the autonomous vehicle may not capture data related to a second property of a second regulator of the one or more regulators, the second property located proximate to the route;
perform autonomous movement on the route based on autonomous movement data received from the one or more sensors of the autonomous vehicle;
detect, during the autonomous movement, a proximity to the second property of the second regulator; and
disable, in response to the detecting of the proximity, a first radar sensor of the one or more sensors of the autonomous vehicle;
generate substitute data related to the second property of the second regulator; and
replace a portion of the autonomous movement data, wherein the portion corresponds to the first radar sensor with the substitute data.

18. The non-transitory computer program product of claim 17, wherein the generating of the substitute data comprises:
requesting moving object data generated from a second radar sensor of a second autonomous vehicle, the second autonomous vehicle owned and controlled by the second regulator.

19. The computer program product of claim 15, wherein the first regulator is the central server.

* * * * *